United States Patent Office 3,697,225
Patented Oct. 10, 1972

3,697,225
INDICATOR FOR THE DETECTION OF COBALT IONS
Dieter Schmitt, Alfred Stein, and Wilhelm Baumer, Darmstadt, Germany, assignors to Merck Patent Gesellschaft mit Beschrankter Haftung Patentabteilung, Darmstadt, Germany
No Drawing. Filed Mar. 9, 1971, Ser. No. 122,542
Claims priority, application Germany, Sept. 10, 1970, P 20 44 801.5
Int. Cl. C09k 3/00; G01n 31/22
U.S. Cl. 23—253 TP                        21 Claims

ABSTRACT OF THE DISCLOSURE

An indicator for the colorimetric detection of cobalt ions is formed by impregnating an absorbent carrier with a composition comprising a water-soluble rhodanide salt, an alkali-metal or ammonium thiosulfate, an alkali metal fluoride and one or more of emulsifier and/or wetting agent, a tertiary amine and a quaternary ammonium salt.

BACKGROUND OF THE INVENTION

This invention relates to an indicator and process for the colorimetric determination of cobalt ions and methods for the production thereof.

In analytical chemistry, the use of identification reagents for the colorimetric determination of certain metal ions has become increasingly important. Test papers for the detection of cobalt ions are known.

In the conventional analytic determination of cobalt ions, a blue colored solution is obtained with a salt of thiocyanic acid. This conventional indicator, however, has several drawbacks. In the first place, the test is only qualitative and is impaired by the presence of copper ions therein which yield a green or brown color with the test paper. Furthermore, high zinc ion concentrations, for example, 1000 mg./l., prevent the detection of smaller amounts, e.g., 10–25 mg./l., of cobalt (II) ions. In addition, cobalt ions cannot be detected if permanganate ions are also present therein. Further, when an absorbent carrier is impregnated with a solution containing salts of thiocyanic acid, a concentration gradient is produced, thus making a semiquantitative determination of the cobalt ions impossible. Consequently, the field of application of this conventional indicator is very limited.

There thus remains a need for an indicator composition and a process for effectively and efficiently performing both qualitative and semiquantitative tests on a cobalt containing solution which can be carried out in a very short period of time and which do not exhibit the aforementioned disadvantages of conventional indicators.

OBJECTS OF THE INVENTION

It is an object of this invention to provide a novel indicator for the detection of cobalt ions. It is another object to provide novel compositions for the semiquantitative determination of cobalt ions. Another object is to provide an indicator which is suitable for performing both quantative and qualitative tests which are not affected by permanganate ions and high concentrations of Zn ions. A further object of the invention is the use of an indicator which changes to a specific color and remains at that color, thus permitting a comparison with a color scale in order to readily determine the amount of cobalt ions present in the solution being tested. A still further object is the provision of an indicator which produces a constant color in a very short period of time. Other objects will be apparent to those skilled in the art to which this invention pertains.

It has now been discovered that these prior art disadvantages can be overcome by employing an indicator composition of this invention. According to one embodiment of this invention an absorbent carrier is impregnated with a composition of this invention, resulting in the formation of an indicator which ensures identical readings at the same cobalt concentration, because identical colorings of the indicator are obtained. Thus, a comparison with a color scale can easily be made, thereby permitting semiquantitative tests on a solution containing cobalt ions. Unexpectedly, it is also possible to obtain sufficient linear correlation between the cobalt ion concentration of the test solution and the color depth produced by using the novel indicator of this invention. Accordingly, the novel indicator is unexpectedly superior to the detection methods and indicators known heretofore.

SUMMARY OF THE INVENTION

The indicators of this invention comprise:

(a) an alkali metal and/or ammonium rhodanide [thiocyanate];
(b) an alkali metal and/or ammonium thiosulfate;
(c) an alkali metal fluoride; and
(d) one or more of an emulsifier wetting agent, tertiary amine, and a quaternary ammonium salt.

By this unique combination of ingredients, it is possible to attain the unexpected advantages of the novel indicators of this invention. Thus, it is now possible to provide an indicator which has high indication sensitivity and selectivity for cobalt ions. When absorbed on an absorbent carrier, the indicator is particularly easy to handle.

DETAILED DISCUSSION

According to one embodiment of this invention, an absorbent carrier is impregnated with an indicating composition of this invention, which ensures identical readings of the cobalt ions present in a test solution because identical colorings of the indicator are obtained independent of the pH of the solutions being examined. Furthermore, the maximum color depth is produced within a very short period of time and remains constant for a long period, so that a comparison with a color scale can be easily carried out. Thus, it is possible to conduct semiquantitative tests to determine the amount of cobalt ions present in a particular solution. In addition, a linear correlation between the cobalt ion concentration of the test solution and the resultant color depth is unexpectedly obtained with the novel indicator compositions of this invention.

DESCRIPTION OF THE INVENTION

Salts of thiocyanic acid which are employed are water-soluble rhodanides, especially alkali metal or ammonium rhodanides or mixtures thereof. Ammonium rhodanide is preferred.

The water-soluble thiocyanic acid salt is present in an amount sufficient to ensure conversion of all cobalt ions present in the test solution to a colored reaction product. The exact amount required will, of course, depend upon the volume of test liquid applied to the reagent composition and the cobalt concentration thereof. When the reagent composition is absorbed on an absorbent carrier, a concentration of about 2 to 12%, preferably about 7 to 9%, in the solution thereof applied to the absorbent carrier will suffice to react with all the cobalt ions in test solutions which would normally thereafter be applied to the absorbent carrier impregnated with the reagent composition.

The alkali metal and/or ammonium thiosulfate, preferably sodium thiosulfate, used in the impregnating solution is present in an amount effective to mask any copper, zinc, and/or permanganate ions present in the solution to be tested. Generally, the amount of alkali metal and/or ammonium thiosulfate present is between about 2 and 15% and preferably between 10 to 12% by weight. Alkali metal fluorides, preferably potassium fluoride, are present in the composition in order to prevent any iron (III) and bismuth (III) ions from interfering with the cobalt determinations of this invention. Best results have been secured utilizing compositions containing between about 2 and 15% by weight alkali metal fluoride, preferably about 12 to 15%. The compositions of this invention also contain one or more of a surfactant, a tertiary amine, or quaternary ammonium salt. These are present in an amount between about 0.5-6% by weight of the solution. Without at least one of these components, it is not possible to obtain an indicator suitable for carrying out semiquantitative determinations of cobalt ions.

The surfactant can be a wetting agent and/or an emulsifier. Preferred surfactants are those generally employed for the preparation of oil-in-water emulsions. Preferred are those which contain polyalkylene oxide groups, preferably polyethylene oxide and/or polypropylene oxide groups. In one group of compounds, the wetting agent properties are predominant, whereas, in other compounds, the emulsifying properties predominate. Nonionic emulsifiers and/or wetting agents are preferred, but anionic surfactants are also suitable for the present invention. The exact nature of these substances is not critical and the selection of one which does not interfere with the main reaction can readily be accomplished from published information.

It has been found that a great variety of emulsifiers and/or wetting agents containing polyalkylene oxide units yield the desired result. Examples of suitable emulsifiers and/or wetting agents which can be employed include: ethylene oxide derivatives of fatty alcohols; polypropylene glycol-ethylene oxide addition products; polyglycol ethers, e.g., alkylaryl polyglycol ethers, including nonylphenol polyglycol ethers and tributylphenol polyglycol ethers; and polyoxyethylenephosphoric acid esters, a group of liquid anionic surface-active substances.

The amount of emulsifier and/or wetting agent to be added to the impregnating composition ranges between about 0.5 and 6 g./100 ml. and preferably between 3 and 4 g./100 ml. of impregnating composition. Larger quantities can also be employed since the desired results are not impaired.

Especially suitable as tertiary amines are those of the formula $R_3N$ or $RR'_2N$, wherein R and R' are, in each instance, hydrocarbon radicals containing up to 20 carbon atoms, and R contains at least 4 carbon atoms, and preferably from 4 to 20 carbon atoms. R' preferably contains from 4 to 8 carbon atoms. The alkyl groups can contain one or more nonfunctional substituents such as hydroxyl or halogen which do not substantially affect the function of the compounds.

Especially preferred as quaternary ammonium salts are those having one of the formulae:

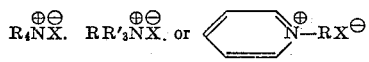

wherein R and R' each have the above-indicated meanings and X is a halogen ion, preferably chlorine. Examples of such preferred tertiary amines and quaternary ammonium salts are the trialkylamines, e.g., tri-n-butylamine, ethyl di-n-butylamine, diethyl n-butylamine, 1,2 - diphenyl-dimethylaminoethane, N,N - bis - ($\beta$-carbethoxyethyl)-ethylamine, N-cetylpyridinium chloride, alkyl dimethyl-benzylammonium chloride, ethyl dodecyldimethylammonium bromide.

The amount of tertiary amine or quaternary amine or mixtures thereof employed is generally between 0.5 and 6, and preferably between 1 and 3 g./100 ml. of impregnating solution.

It has unexpectedly been found that the addition of quaternary ammonium salts to the impregnating solutions of this invention result in the formation of the same color intensity when employed as a substitute for emulsifiers, wetting agents, and/or tertiary amines, although the quaternary ammonium salts do not contain free electron pairs in the molecule, as do the latter three substances.

Suitable absorbent carriers include those which are normally used in combination with identification reagents. Filter paper is preferred. It is also possible to employ other forms of absorbent cellulose and cellulose derivatives and absorbent plastic products, e.g., sheets of polyester fiber and fiberglass laminate.

n the process of this invention, an absorbent carrier is impregnated with one or more solutions containing 2–12% of (a), 2–15% of (b), 2–15% of (c), and 0.5–6% of (d).

According to a preferred embodiment of the invention, the absorbent carrier is impregnated successively with at least two different solutions, each of which contains only a portion of the components (a)–(d), preferably in different solvents. Thus, for example, one of the impregnating solutions can contain components (b) and (c) and the other can contain the components (a) and (d). However, it is advantageous that the component (b) be entirely or partially contained in the solution which also contains components (a) and (d). When the impregnation is conducted with separate solvent solutions, it is of course, necessary to dry the absorbent carrier between the impregnating steps. The components can be applied in the form of an aqueous and/or aqueous-organic solvent solution.

Suitable organic solvents include volatile solvents which readily evaporate and dissolve the ingredients contained therein. Suitable solvents include the lower alkanols e.g., methanol, ethanol, isopropanol, or mixtures thereof, especially methanol.

To prepare a two-solution impregnating solution, a first solution (I) is prepared by dissolving (b) 2–10 g. of sodium thiosulfate and (c) 2–15 g. of potassium fluoride in 100 ml. of water.

A second impregnating solution (II) is prepared by dissolving, in 100 ml. of water or in a mixture of an organic solvent and water in a ratio of 4:1 to 1:4, the following ingredients:

(a) 2–12 g. alkali metal and/or ammonium rhodanide;
(b) 0–5 g. sodium thiosulfate; and
(c) 0.5–6 g. emulsifier, wetting agent, a tertiary amine or a quaternary ammonium salt or mixtures thereof.

The absorbent carriers, preferably filter paper, are successively impregnated with the impregnating solution or solutions in a conventional manner so as to provide a pickup of the solution of about 5–85%, preferably about 17–65%, calculated on the dry weight of the carrier. The impregnated papers can either be cut into handy strips, or they can be processed into preferably square pieces. They can then be conventionally gued onto plastic films, paper strips, or metallic strips, or sealed onto or into such films and strips.

The indicators of this invention, as they are used for the colorimetric determination of cobalt ions, comprise an absorbent carrier uniformly impregnated (per m.² of surface area) with:

(a) 7–45 g., preferably 25–32 g., of an alkali metal or ammonium rhodanide;
(b) 7–55 g., preferably 35–45 g., of an alkali metal or ammonium thiosulfate;
(c) 7–55 g., preferably 40–55 g., of an alkali metal fluoride; and
(d) 1.5–20 g., preferably 11–15 g., of a surfactant, tertiary amine and/or quaternary ammonium salt.

In order to detect the presence of cobalt ions in a test solution, these test strips are dipped into the solution to be examined until the testing zone is completely wetted and then removed. In the presence of cobalt ions, the testing zone is colored blue. The shade of blue is compared with a standard color scale, e.g., after about 10–15 seconds to determine the cobalt ion concentration of the solution.

In this semiquantitative detection method, marked shades of the blue color can be observed between 10, 25, 50, 100, 250 and 1000 mg./l. (or p.p.m.) of cobalt ions present in a solution being tested in accordance with this invention. The novel indicator is distinguished by a very high selectivity and sensitivity. In practicing this invention, it is even possible to detect as little as 10 mg./l. of cobalt ions in solution with certainty, with a blue coloring of the identification zone of the test strip.

The accuracy of the semiquantitative determination is independent of the pH of the solution to be tested when the pH range is between 1 and 7. When the test solution contains more than 1000 mg./l. of cobalt ions, the solution or a portion thereof is first diluted to such an extent that a blue coloring can be obtained which is within the color scale. By multiplying in accordance with the selected dilution, a semiquantitative indication of the concentration of the cobalt ions is also obtained according to this embodiment of the invention.

It is advisable to buffer very strongly acidic solutions having a pH of below 1 by incorporating therein a buffer substance, e.g., sodium acetate, so as to maintain the pH above 1 and generally between 1 and 7.

The novel indicator compositions of this invention are very specific to cobalt ions. The influence of other cations on the test is extremely minor. Thus, the indication procedure of this invention is not impaired by the presence of less than 1000 mg./l. of the following ions, respectively:

$Ag^+$, $Al^{3+}$, $As^{3+}$, $Au^{3+}$, $Ba^{2+}$, $Be^{2+}$, $Bi^{3+}$, $Ca^{2+}$, $Ce^{4+}$, $Cd^{2+}$, $Cr^{3+}$, $Cu^{2+}$, $Fe^{2+}$, $Fe^{3+}$, $K^+$, $Li^+$, $Mg^{2+}$, $Mn^{2+}$, $NH_4^+$, $Na^+$, $Ni^{2+}$, $Pb^{2+}$, $Rb^+$, $Sb^{3+}$, $Sn^{2+}$, $Sr^{2+}$, $Ti^{4+}$, $Tl^+$, $VO^{2+}$, $Zn^{2+}$, $Zr^{4+}$.

If the color produced in the testing zone deviates from the color scale, a waiting period of about two minutes is allowed to elapse, whereupon the color is then compared with the color scale. If it is still not possible to correlate the colors in this manner, the test has been impaired by a high concentration of foreign ions. In this event, the interfering ions must be masked, by adding, to about 5 ml. of the solution to be examined, a small amount of a masking substance in an amount effective to mask the interfering ion. $Fe^{3+}$ and $Bi^{3+}$ ions are masked with potassium fluoride, $Cu^{2+}$ is masked with sodium thiosulfate, and $Hg^+$ is masked with sodium chloride. In the presence of $Mo^{2+}$ to $Mo^{5+}$, the solution to be tested is mixed, for example, with potassium permanganate crystals until a permanent pink coloring is obtained, so that the cobalt ion concentration can then be determined with the indicator of this invention.

The influence of anions on the test also is extremely minor. The detection procedure is not impaired by less than, 1000 mg./l, respectively, of $Br^-$, $BrO_3^-$, $Cl^-$, $ClO_3^-$, $ClO_4^-$, $F^-$, $I^-$, $IO_3^-$, $IO_4^-$, $MnO_4^-$, $Mo_7O_{24}^{6-}$, $N_3^-$, $NO_3^-$, $OCN^-$, $PO_4^{3-}$, $SCN^-$, $SeO_3^{2-}$, $SO_3^{2-}$, $SO_4^{2-}$, $S_2O_3^{2-}$, $S_2O_4^{2-}$, $S_2O_5^{2-}$, $S_2O_8^{2-}$, $WO_4^{2-}$, acetate, ascorbate, citrate, oxalate, succinate or tartrate.

More than 250 mg. of $NO_2^-$ in the solution being tested interferes with its weak pink color. This can be avoided by the addition of amidosulfonic acid thereto.

$CrO_4^{2-}$ and $VO_3^-$ also interfere because of their inherent color, but which disappears with the addition of ascorbic acid, e.g., in an amount between 2 and 5%, $CN^-$, $[Fe(CN)_6]^{4-}$, and $[Fe(CN)_6]^{3-}$ eliminate cobalt ions from the detection process due to the formation of complexes with the cobalt ions.

The novel indicator thus exhibits considerable advantages over the previously known identification reactions for cobalt ions. According to the foregoing, it is possible to conduct semiquantitative detedminations at a very high level of selectivity and, unexpectedly, the accuracy of detection is independent of the pH of the solution to be examined over a very wide pH range.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

Filter paper (No. 1451 or 1450 CV of the firm Schleicher and Schüll) is impregnated with solution I, dried, and thereafter impregnated with solution II and once again dried. The thus-obtained impregnated filter paper is then cut into small squares of about 5 x 5 mm. and glued onto plastic strips of 6 x 60 mm. at the lower end thereof.

Impregnating solution I contains:

15 g. potassium fluoride
10 g. sodium thiosulfate
100 ml. water

Impregnating solution II contains:

10 g. ammonium rhodanide
3 g. of an alkylphenol polyglycol ether, e.g., MARLOPHEN 89® manufacturer Chemische Werke Hüls, Germany
3 g. tri-n-butylamine
2 g. ethyl dodecyldimethylammonium bromide
100 ml. methanol/water (3:7)

The test rod exhibits a blue color after having been dipped into a solution containing 7500 mg./l. of copper (II) ions, 4500 mg./l. of iron(III) ions, and 10 mg./l. of cobalt ions. According to the appropriate standard color scale, this blue color corresponds to a value of 10 mg./l. of $Co^{++}$.

EXAMPLE 2

Solutions are prepared analogously to Example 1, except that solution I contains 13 g. of potassium fluoride and 6.5 g. of sodium thiosulfate in 100 ml. of water, and impregnating solution II contains 8.5 g. of ammonium rhodanide, 3 g. of sodium thiosulfate, and 1.5 g. of an alkylphenol polyglycol ether MARLOPHEN 89® in a mixture of methanol/water in the ratio of 7:3.

This indicator can also be employed for conducting semiquantitative cobalt determinations.

EXAMPLE 3

Impregnating solutions are prepared analogously to Example 2, but impregnating solution II additionally contains 3 g. of tri-n-butylamine.

With this indicator, semiquantitative cobalt determinations can be conducted.

EXAMPLE 4

Impregnating solutions are prepared analogously to Example 2, except impregnating solution II additionally contains 5 g. of ethyl dodecyldimethylammonium bromide in a mixture of methanol/water in a volume ratio of 1:1.

This indicator can also be employed for conducting semiquantitative cobalt determinations.

EXAMPLE 5

In the impregnating solution II set forth in Example 2, the alkylphenol polyglycol ether is, in each case, substituted by one of the following compounds:

(a) 1.5 g. alkylaryl polyglycol ether, e.g., EMULGATOR ISM, manufacturer Chemische Werke Hüls, Germany
(b) 3 g. fatty alcohol polygolycol ether, e.g., MARLIPAL MG®, manufacturer Chemische Werke, Hüls, Germany
(c) 2 g. propylene glycol-ethylene oxide addition product, e.g., MARLOX LP 9020®, manufacturer Chemische Werke Hüls, Germany
(d) 2 g. polyoxyethylenephosphoric acid ester, e.g., GAFAC PE 510®, manufacturer General Aniline and Film Corp.
(e) 3 g. tri-n-butylamine
(f) 2 g. ethyl di-n-butylamine
(g) 2.5 g. diethyl n-butylamine (h) 3 g. 1,2-diphenyldimethylaminoethane
(i) 1.5 g. N,N-bis(β-carbethoxyethyl)-ethylamine
(j) 1 g. N-cetylpyridinium chloride
(k) 1.5 g. alkyl dimethylbenzylammonium chloride
(l) 1.5 g. ethyl dodecyldimethylammonium bromide.

Each of the indicators produced indicates the same content of cobalt ions when used with the test solution set forth in Example 1.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An indicator for the colorimetric detection of cobalt ions comprising an absorbent carrier impregnated with:
   (a) an alkali metal or ammonium rhodanide;
   (b) an alkali metal or ammonium thiosulfate;
   (c) an alkali metal fluoride; and
   (d) one or more of an emulsifier, wetting agent, tertiary amine and quaternary ammonium salt.

2. An indicator according to claim 1 wherein the thiosulfate is sodium thiosulfate.

3. A process for the colorimetric determination of cobalt ions in aqueous solutions which comprises moistening an indicator of claim 1 with the aqueous solution to be tested.

4. An indicator according to claim 1 wherein the rhodanide is ammonium rhodanide.

5. A process for the colorimetric determination of cobalt ions in aqueous solutions which comprises moistening an indicator of claim 4 with the aqueous solution to be tested.

6. An indicator according to claim 1 wherein the fluoride is potassium fluoride.

7. An indicator according to claim 6 wherein the rhodanide is ammonium rhodanide and wherein the thiosulfate is sodium thiosulfate.

8. A process for the colorimetric determination of cobalt ions in aqueous solutions which comprises moistening an indicator of claim 7 with the aqueous solution to be tested.

9. An indicator according to claim 1 wherein the carrier is paper.

10. A process for the colorimetric determination of cobalt ions in aqueous solutions which comprises moistening an indicator of claim 9 with the aqueous solution to be tested.

11. An indicator according to claim 8 wherein the rhodanide is ammonium rhodanide.

12. A process for the colorimetric determination of cobalt ions in aqueous solutions which comprises moistening an indicator of claim 11 with the aqueous solution to be tested.

13. An indicator according to claim 8 wherein the rhodanide is ammonium rohdanide and wherein the thiosulfate is sodium thiosulfate.

14. A process for the colorimetric determination of cobalt ions in aqueous solutions which comprises moistening an indicator of claim 13 with the aqueous solution to be tested.

15. A method for preparing an indicator for the colorimeter detection of cobalt ions which comprises impregnating an absorbent carrier with:
   (a) an alkali metal or ammonium rhodanide;
   (b) an alkali metal or ammonium thiosulfate;
   (c) an alkali metal fluoride; and
   (d) one or more of an emulsifier, wetting agent, tertiary amine and quaternary ammonium salt.

16. A method according to claim 15 wherein the carrier is paper.

17. A method according to claim 15 wherein the rhodanide is ammonium rhodanide.

18. A method according to claim 15 which comprises the steps of applying to the absorbent carrier a solution of a portion of the impregnating materials (a), (b), (c) and (d); drying the carrier; applying a solution of the remainder of the impregnating materials; and again drying the carrier.

19. A method according to claim 18 wherein one of the impregnating soltuions comprises (b) and (c) and another impregnating solution comprises (a) and (d).

20. A method according to claim 18 wherein one of the impregnating solutions comprises potassiumfluoride and sodium thiosulfate and the other impregnating solution comprises ammonium rhodanide and (d).

21. A method according to claim 18 wherein one of said impregnating solutions contains 2–12% of (a) and 0–5% of (b) and 0.5–6 g. of (d) and the other solution contains 2–10% of (b) and 2–15% of (c).

References Cited

Kontsevich et al.: Chem. Abstr. 70, 63762r (1969).

MORRIS O. WOLK, Primary Examiner
R. M. REESE, Assistant Examiner

U.S. Cl. X.R.

252—408